US 6,529,201 B1

(12) United States Patent
Ault et al.

(10) Patent No.: US 6,529,201 B1
(45) Date of Patent: Mar. 4, 2003

(54) METHOD AND APPARATUS FOR STORING AND ACCESSING TEXTURE MAPS

(75) Inventors: David Nolan Ault, Austin, TX (US); Patrick Richard Brown, El Dorado Hills, CA (US); Mark Anthony Nadon, Austin, TX (US); William Bryan Tiernan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/377,637

(22) Filed: Aug. 19, 1999

(51) Int. Cl.⁷ .............................................. G06T 11/40
(52) U.S. Cl. ...................... 345/582; 345/552
(58) Field of Search .................. 345/430, 503, 345/512, 507, 582, 543, 544, 552, 567, 570, 571

(56) References Cited

U.S. PATENT DOCUMENTS

| | | | |
|---|---|---|---|
| 6,002,407 A | * 12/1999 | Fadden | |
| 6,088,047 A | * 7/2000 | Bose et al. | 345/547 |
| 6,111,584 A | * 8/2000 | Murphy | 345/430 |
| 6,118,462 A | * 9/2000 | Margulis | 345/521 |
| 6,141,725 A | * 10/2000 | Tucker et al. | 345/582 |
| 6,157,743 A | * 12/2000 | Goris et al. | 345/507 |
| 6,243,081 B1 | * 6/2001 | Goris et al. | 345/430 X |

* cited by examiner

*Primary Examiner*—Jeffery Brier
(74) *Attorney, Agent, or Firm*—Joseph P. Lally; Mark E. McBurney

(57) ABSTRACT

A texture image that comprises a set of texels wherein each texel is assigned a (u,v) coordinate pair of a texture coordinate space. Each texel is then stored in memory at a memory address determined by applying a transformation function to the texel's (u,v) coordinate pair. The transformation function is customized to associate two dimensional portions of the texture coordinate space to each page of memory. When the texture image (or a portion of the texture image) stored in memory is later mapped to an object during rendering the object, the allocation of two dimensional portions of the texture coordinate space to each memory page reduces the number of memory pages accessed during the rendering of the object. The reduction in the number of memory pages accessed during the texture mapping process translates into improved texture mapping performance. Preferably, the memory in which the texture image is stored comprises a dedicated texture memory of the graphics display system to eliminate contention with the frame buffer. In the presently preferred embodiment, the transformation function is accomplished by interleaving alternating u-bits and v-bits of the (u,v) coordinate pair to generate an offset value. The offset value is then added to a base address of the memory in which the texture image is stored to generate the memory address.

17 Claims, 4 Drawing Sheets

| 0,1 | 0,1 | 0,2 | 0,3 | 0,4 | 0,5 | 0,6 | 0,7 |
|---|---|---|---|---|---|---|---|
| 1,0 | 1,1 | 1,2 | 1,3 | 1,4 | 1,5 | 1,6 | 1,7 |
| 2,0 | 2,1 | 2,2 | 2,3 | 2,4 | 2,5 | 2,6 | 2,7 |
| 3,0 | 3,1 | 3,2 | 3,3 | 3,4 | 3,5 | 3,6 | 3,7 |
| 4,0 | 4,1 | 4,2 | 4,3 | 4,4 | 4,5 | 4,6 | 4,7 |
| 5,0 | 5,1 | 5,2 | 5,3 | 5,4 | 5,5 | 5,6 | 5,7 |
| 6,0 | 6,1 | 6,2 | 6,3 | 6,4 | 6,5 | 6,6 | 6,7 |
| 7,0 | 7,1 | 7,2 | 7,3 | 7,4 | 7,5 | 7,6 | 7,7 |

FIG.3

| 0,1 | 0,1 | 0,2 | 0,3 | 0,4 | 0,5 | 0,6 | 0,7 |
|---|---|---|---|---|---|---|---|
| 1,0 | 1,1 | 1,2 | 1,3 | 1,4 | 1,5 | 1,6 | 1,7 |
| 2,0 | 2,1 | 2,2 | 2,3 | 2,4 | 2,5 | 2,6 | 2,7 |
| 3,0 | 3,1 | 3,2 | 3,3 | 3,4 | 3,5 | 3,6 | 3,7 |
| 4,0 | 4,1 | 4,2 | 4,3 | 4,4 | 4,5 | 4,6 | 4,7 |
| 5,0 | 5,1 | 5,2 | 5,3 | 5,4 | 5,5 | 5,6 | 5,7 |
| 6,0 | 6,1 | 6,2 | 6,3 | 6,4 | 6,5 | 6,6 | 6,7 |
| 7,0 | 7,1 | 7,2 | 7,3 | 7,4 | 7,5 | 7,6 | 7,7 |

FIG.4

METHOD AND APPARATUS FOR STORING AND ACCESSING TEXTURE MAPS

BACKGROUND

1. Field of the Present Invention

The present invention generally relates to the field of computer graphics and more particularly to a method and apparatus for improving the performance of texture mapping operations by decreasing the number of memory pages a texture mapping operation must access while rendering a typical graphic object such as a triangle or polygon.

2. History of Related Art

In the field of computer graphics, gross surface detail may be added to graphic objects by generating explicit surface detail objects that are coplanar with their associated graphic objects. For the replication of more detailed surface features, however, explicit generation of surface detail objects is typically not feasible. Instead, surface detail may be generated by storing a digital image, referred to as a texture image, and then mapping the texture image, or portions thereof, onto a graphic object. This technique is generally referred to as a texture mapping. Because the process of mapping the texture image to the graphic object is largely independent of the complexity of the texture image itself, texture mapping can significantly improve the performance of a graphics system that is required to generate graphics scenes with intricate surface detail. Unfortunately, however, the efficiency of a texture mapping operation, in which data is retrieved from a texture image memory, is frequently limited by the design of the texture image memory subsystem. More specifically, the texture image memory is typically arranged as a plurality or set of memory pages. Each page corresponds to a portion of the entire memory. When data is retrieved from (or written to) memory, the graphics memory subsystem "opens" the page. Once a page is opened, memory locations within that page can be accessed in a relatively efficient manner. Opening the page, however, typically involves significant overhead in terms of the number of clock cycles required. Thus, a memory system is efficiently organized if the application that accesses the memory accesses a new memory page relatively infrequently. In the specific case of texture mapping applications, however, the arrangement of memory pages is typically not optimized to minimize the number of texture image memory pages that must be accessed when rendering an object. Accordingly, the texture mapping process for typically encountered graphics objects such as triangles and polygons is undesirably slow due to frequent opening of new memory pages. Therefore, it would be highly desirable to implement a strategy to address the number of memory pages accessed when applying texture images to graphics objects. It would be further desirable if the implemented solution did not significantly increase the cost or complexity of the memory subsystem and did not otherwise slow the performance of the graphics rendering process.

SUMMARY OF THE INVENTION

The problems identified above are in large part addressed by a method and an associated computer system for efficiently performing texture mapping operations. Efficiency is achieved by reducing the number of memory pages accessed during texture mapping of typical graphics objects such as triangles and polygons. Broadly speaking, the invention contemplates generating a texture image that comprises a set of texels. Each texel is assigned a (u,v) coordinate pair of a texture coordinate space. Each texel is then stored in memory at a memory address determined by applying a transformation function to the texel's (u,v) coordinate pair. The transformation function is customized to associate two dimensional portions of the texture coordinate space to each page of memory. When the texture image (or a portion of the texture image) stored in memory is later mapped to an object during rendering the object, the allocation of two dimensional portions of the texture coordinate space to each memory page reduces the number of memory pages accessed during the rendering of the object. The reduction in the number of memory pages accessed during the texture mapping process translates into improved texture mapping performance. Preferably, the memory in which the texture image is stored comprises a dedicated texture memory of the graphics display system to eliminate contention with the frame buffer. In the presently preferred embodiment, the transformation function is accomplished by interleaving alternating u-bits and v-bits of the (u,v) coordinate pair to generate an offset value. The offset value is then added to a base address of the memory in which the texture image is stored to generate the memory address.

BRIEF DESCRIPTION OF THE DRAWINGS

Other objects and advantages of the invention will become apparent upon reading the following detailed description and upon reference to the accompanying drawings in which:

FIG. 3 is a conceptual representation of a texture image coordinate space and its associated memory page allocation;

FIG. 4 is a conceptual representation of a texture image coordinate space and its associated memory page allocation according to one embodiment of the present invention.

Figure 1:
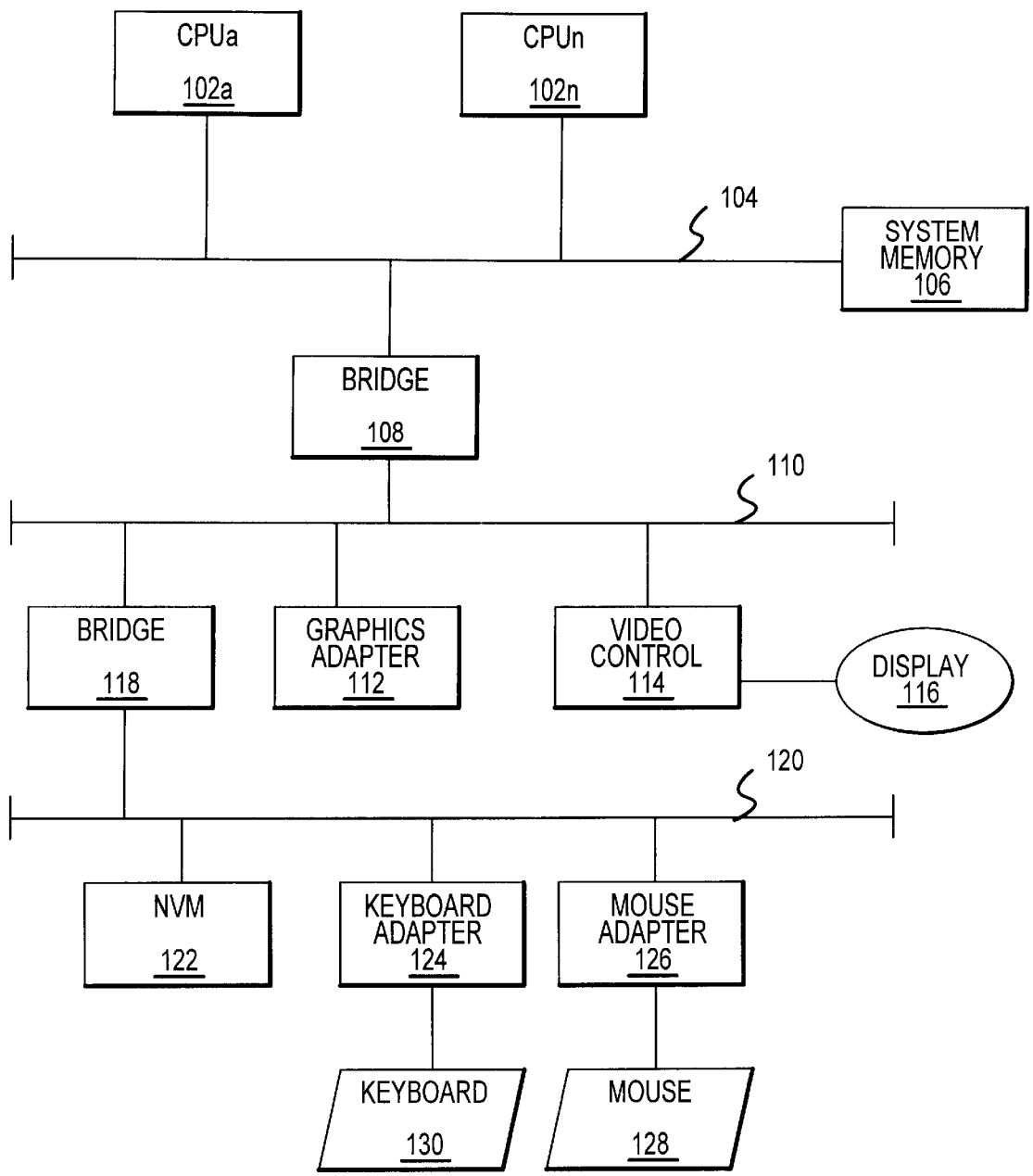
FIG. 1 is a block diagram of selected components of a computer system including a graphics adapter according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a simplified block diagram of one embodiment of a computer system 100 suitable for use with the present invention. The depicted embodiment of system 100 includes one or more processors 102a . . . 102n (generically or collectively referred to herein as processor or processors 102) coupled via a system bus 104. The invention is not contemplated to be limited to any specific brand, type, or family of processors. In one embodiment, RS/6000 type RISC processors from IBM Corporation may be used as processors 102. In other embodiments, processors 102 may be selected from the x86 family processors or from the Motorola 68000 family of processors. A system memory 106, typically implemented as an array of dynamic RAM's, is accessible to processors 102 via system bus 104. System 100 may include one or more memory controller devices between local bus 104 and system memory 106. Alternatively, memory control functions may be integrated into processors 102. Although the architecture of the depicted embodiment of computer system 100 is representative of a symmetric multiprocessing (SMP) architecture in which each processor 102 has essentially equivalent access to system memory 106, system 100 may also be implemented in other architectural arrangements such as a non-uniform memory architecture in which each processor 102 has relatively fast access to a local portion of the system memory and somewhat slower access to the portions of system memory that are local to other processors of the system.

A first bridge 108 of system 100 provides an interface between system bus 104 and a first peripheral or I/O bus 110. A wide variety of I/O devices may be coupled to first I/O bus 110 including hard disk controllers, audio adapters, and high speed network controllers for embodiments in which system 100 comprises one of multiple interconnected systems in a computer network. First I/O bus 110 is preferably compliant with any of a variety of high performance industry standard I/O bus architectures including the PCI, MCA, AGP, or EISA bus architectures. In the implementation of system 100 shown in FIG. 1, a graphics adapter 112 and video controller 114 are coupled to first I/O bus 110. Graphics adapter 112 is preferably adapted execute a variety of graphics instructions to manage the contents of a dedicated memory array typically referred to as a frame buffer (not depicted in FIG. 1). The frame buffer may comprise a portion of system memory 106 or, more preferably, graphics adapter 112 may includes its own dedicated frame buffer. Video controller 114 is configured to continuously refresh a display device 116 with the contents of the frame buffer. Although video controller 114 and graphics adapter 112 are shown as distinct units in FIG. 1, they may be integrated into a single integrated circuit or module.

Before discussing graphics adapter 112 of FIG. 1 in greater detail, additional elements of system 100 are discussed for the sake of completeness. The depicted embodiment of FIG. 1, includes a second bridge 118 that provides an interface between first I/O bus 110 and a second I/O bus 129 thereby providing a path between second I/O bus 120 and system bus 104. Second I/O bus 120 is preferably compliant with various industry standard bus architectures including the ISA and PCI bus architectures. In one suitable arrangement, first I/O bus 110 is a PCI bus suitable for providing capabilities for high performance peripheral devices, while second bus 120 is an ISA bus to provide support for the broad base of ISA compliant peripheral devices. In the depicted embodiment, a non-volatile memory device (NVM) 122 is coupled to second I/O bus 120. NVM 122 is preferably configured with a set of computer instructions executable by processors 102. NVM 122 is preferably implemented as a flash memory device desirable for its combination of non-volatility and programmability. In the preferred embodiment, the set of computer instructions contained in NVM 122 includes a boot code sequence suitable for transitioning computer system 100 from an idle state to a functional state following a system reset. The boot code sequence typically includes code suitable for loading the operating system software and may further includes the system's basic input/output system (BIOS). BIOS is utilized in conjunction with certain operating systems such as the OS/2 operating system from IBM Corporation and includes low level microcode that controls the I/O device hardware such as the disk drives of system 100. Detailed BIOS information may be found in Croucher, *Que's BIOS Companion* (MacMillan 1998). Additional information regarding the OS/2 operating system is available in *OS/2 Version 2.1 Facts & Features* (Order No. G326-0169-04) from IBM Corporation. In alternative embodiments, system 100 may be implemented for use with non-BIOS based operating systems such as JavaOS and other suitable network based operating systems. Such operating systems are typically relatively small (compared to BIOS based operating systems), platform independent operating systems that are adapted to execute applications directly on hardware platforms without requiring any other host operating system. Regardless of software implementation, system 100 further includes conventional input devices such as a keyboard 130 and mouse or other suitable pointing device 128 coupled to host bus 104 (via I/O busses 110 and 120) through keyboard adapter 124 and mouse adapter 126 respectively.

Figure 2:
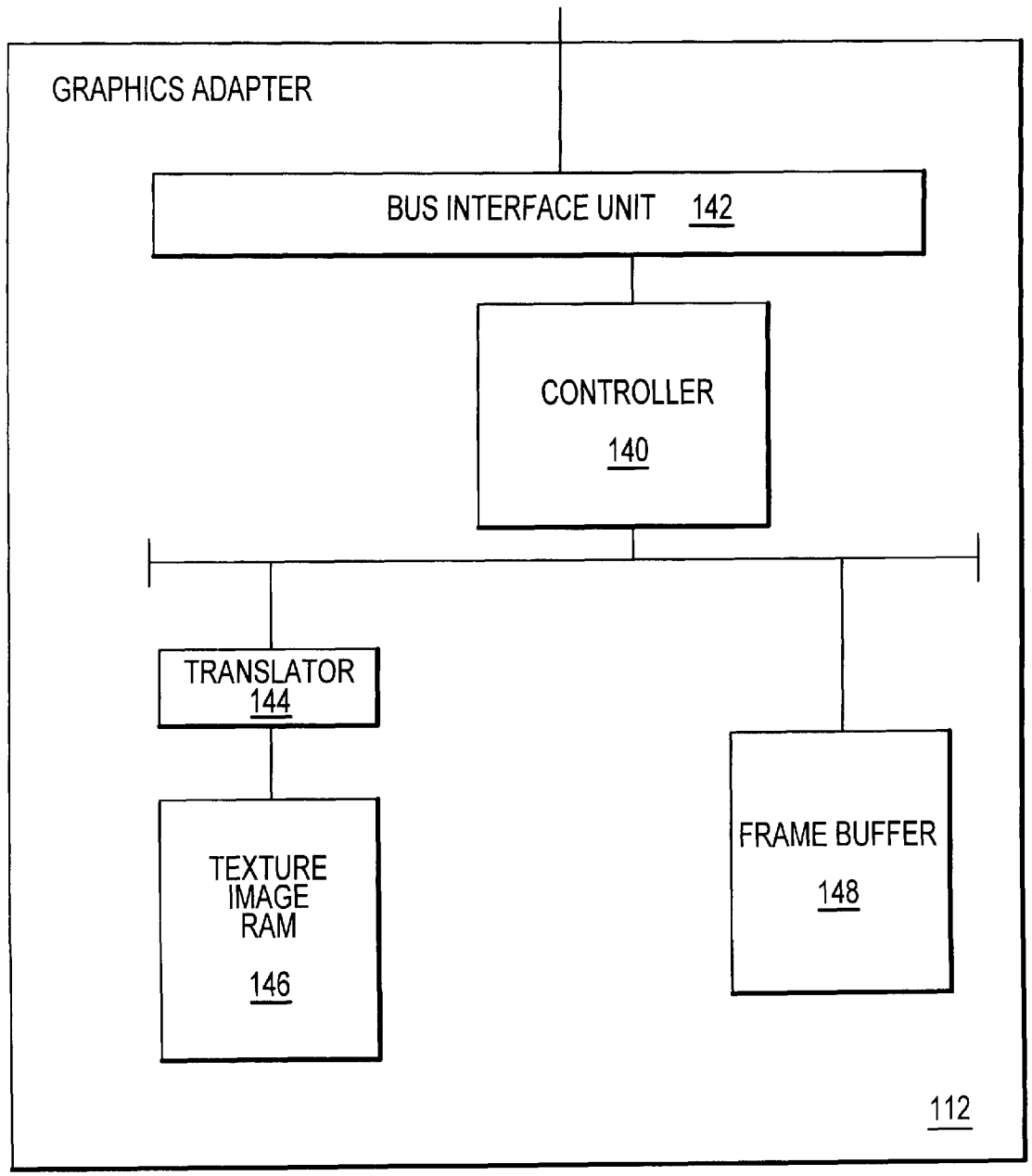
FIG. 2 is a block diagram of selected components of a graphics adapter according to one embodiment of the present invention.

A desirable characteristic of computer system 100 is its efficient performance with respect to texture mapped graphics operations. More specifically, the preferred embodiment of computer system 100 includes a graphics adapter 112 specifically tailored to reduce memory access latency and overhead during the execution of texture mapped graphics operations. Turning to FIG. 2, a simplified block diagram of one embodiment of graphics adapter 112 is presented. Graphics adapter 112 includes a controller 140 that is suitable for executing graphics instructions that are typically provided via a graphics application program interface (API) such as OpenGL, PHIGS, and Direct3D. Controller 140 communicates with I/O bus 110 via a suitable bus interface unit 142. In the depicted embodiment, graphics adapter 112 includes an integrated frame buffer 148 that provides a memory array for storing a digital representation of a graphics image for display on displace device 116. Graphics adapter 112 is suitable for creating 2D image projections of a 3D graphics scene by performing various operations including transformation, clipping, culling, lighting, and texture coordinate generation on geometric primitives such as points, lines, and polygons in a process typically referred to as rendering. Rendering further includes processing the primitives to determine component pixel values for the display device, a process often referred to specifically as rasterization.

As previously mentioned, surface detail is typically provided to graphics objects by mapping a digitized or synthesized image (the texture image) onto the surface of a graphics object. The texture image is frequently referred to as a texture map and the individual elements of the texture map are referred to as texels. As will be appreciated to those skilled in the field of 3D graphics, the texture map is assigned its own coordinate space defined, by convention, by a u-axis and a v-axis and the location of each texel within the texture map is defined by a (u,v) coordinate pair. During the rendering of an object, a set of texture map coordinates are generated that dictate how the texture image will be applied to the object. In this manner, complex images can be created in an efficient manner since the image is simply loaded into memory thereby simplifying the process of applying the image to the object being rendered. For additional detail regarding texture mapping, the reader is referred to James D. Foley et al., *Computer Graphics, Principles and Practice* (*Second Edition in C*), pp. 741 et seq. (Addison-Wesley 1996).

Texture mapping performance is greatly dependent on the efficiency with which texels can be retrieved from memory. In the preferred embodiment of graphics adapter 112 and computer system 100, memory access delays are, in part, reduced through the use of a dedicated texture image memory 146. The use of a dedicated texture image memory 146 reduces or eliminates contention that occurs when the texture map and frame buffer share a common memory space. While various components of graphics adapter 112 such as controller 140 and bus interface unit 142 may comprise portions of a single integrated circuit, other components such as texture image memory 146 may be suitably implemented as one or more memory modules. Preferably, in a multi-module embodiment of graphics adapter 112, the components of graphics adapter 112 shown in FIG. 2 are interconnected on a printed circuit board suitable for insertion in an expansion slot connector of system 100.

While the use of a dedicated texture image memory 146 beneficially improves the performance of texture mapping operations in graphics adapter 112, additional performance improvement is achieved in the preferred embodiment of graphics adapter 112 according to the invention through the use of translation unit 144. When it is necessary to store a texture image in texture image memory 146 or retrieve texture image data from texture image memory 146, controller 140 passes an input address to translation unit 144 in the form of a (u,v) coordinate pair associated with the desired texel or texels in texture image memory 146. Translation unit 144, in response to receiving an input address from controller 144, performs a transformation function on each (u,v) coordinate pair received from controller 140 to produce an output address that is used to access texture image memory 146. In the preferred embodiment, the transformation of (u,v) coordinate pairs into an output address includes calculating an address offset value based on the value of the (u,v) coordinate pair and adding the offset value to a base value, where the base value represents the address of the first memory location in texture image memory 146. In the preferred embodiment, the transformation function performed in translation unit 144 is designed to improved performance by creating an association between memory pages of texture image memory 146 and 2-dimensional (2D) portions of the texture image coordinate space. Because the majority of graphic objects to which texture mapping is applied, such as triangles and polygons, are two dimensional, texture mapping performance is improved if the entire object maps to a single page of texture image memory 146. Memory systems are typically designed as indicated previously such that entire blocks of memory locations, referred to as pages, can be efficiently retrieved in fewer clock cycles than would be required to retrieve each location in the memory page individually. For example, a memory page may be organized such that, once the page has been accessed, sequential locations within the memory page can be retrieved in a single clock cycle. Regardless of the specific implementation of memory pages in texture image memory 146, it will be appreciated that the time required to retrieve data from, for example, three locations that reside in separate memory pages is longer than the time required to retrieve data from three locations in the same memory page. Thus, the present invention contemplates improved performance by minimizing or reducing the number of memory pages that are accessed during some of the most common texture mapping sequences.

Referring to FIGS. 3 and 4, two embodiments of a texture image memory 146 and their associated memory paging allocations are presented. In both figures, texture image memory 146 is represented by the (u,v) coordinate pairs of the texture image stored in texture image memory 146 and the pages of texture memory 146 are represented by solid lines. In the linear arrangement of FIG. 3, each memory page is associated with a single row of the texture coordinate space. Thus, the storage locations with texture image memory 146 that correspond to common rows of the (u,v) coordinate system are stored in a common page of memory. The linear arrangement of FIG. 3 offers the advantage of simplicity in terms of implementation and corresponds to the arrangement of information in a variety of applications. Computer program instructions and data, as examples, are frequently accessed in a linear or serial fashion. For such applications, long and narrow memory pages might be an efficient arrangement that tends to minimize the number of times new memory pages must be fetched. In the case of a texture mapping application, however, information is typically not accessed in linear fashion. A small triangle with vertices at (0,0), (4,0) and (0,4), for example, would span four memory pages (one for each "v" coordinate) of the texture image memory 146. Rendering such an object would thus require controller 140 to fetch four different memory pages. For objects of greater size, the number of pages fetches would increase correspondingly. The penalty incurred when a new memory page is opened, which can be on the order of ten or more clock cycles, can significantly impact the efficiency of the texture mapping operation.

To address this problem, translation unit 144 of graphics adapter 112 is configured to reduce the number of memory page fetches required to accomplish texture mapping of a graphics object. Referring to FIG. 4, a simplified representation of a texture coordinate space 150 (greatly reduced in size for illustrative purposes) is shown in which the association between memory pages 152 and the texture coordinate space 150 generated through the use of translation unit 144 is accomplished in a manner wherein each memory page 152 corresponds to a two dimensional portion of texture coordinate space 150. In other words, each memory page 152 includes multiple rows of texture coordinate space 150 and multiple columns. Memory pages that correspond to two dimensional portions of the texture coordinate space improve efficiency in texture mapping operations. In the example given above, in which a relatively small triangle spanned multiple memory pages, the two dimensional arrangement of memory pages as suggested by FIG. 4, enables the object to map to a single page of texture image memory 146. Larger objects will span multiple pages even with the two dimensional arrangement disclosed herein, but the number of pages will be significantly less than the number of pages that would have been accessed in a conventional memory subsystem layout.

In the preferred embodiment, the efficiency gains offered by the invention are maximized if square portions or "substantially square" portions of the texture image memory are associated with each memory page. (For purpose of this disclosure, a substantially square portion refers to a portion in which the number of columns, $2^C$, and the number of rows, $2^R$, are related such that R and C differ by 1 or less). Using an example system in which the texture image memory is organized utilizing 8-bit texels and 2KB memory pages, each memory page would include 2K ($2^{11}$) coordinate pairs of the texture coordinate space. Whereas a conventionally organized subsystem might associate each memory page with a single row and 2K columns thereby preventing a single memory page from fully "encompassing" any object of two dimensions and even many one dimensional objects such as slanted or curved lines, an optimally organized memory subsystem according to the present invention would associate $2^6$ (64) rows and $2^5$ (32) columns of the of the texture coordinate space to each page (or, alternatively, $2^5$ rows and $2^6$ columns). If 4 KB memory pages are used, the optimum 2D arrangement is one in which $2^6$ rows and $2^6$ columns are associated with each page. While square or substantially square associations between portions of the coordinate space and memory pages are preferred, other 2D arrangements may be used in alternative embodiments.

In the preferred embodiment, the association between memory pages 152 and 2D portions of the texture coordinate space 150 is achieved in translator 144 by interleaving alternating bits of the "u" coordinate with the bits of the "v" coordinate to form a single binary number referred to herein as the offset. The offset is added to the base value (i.e., the address of memory location 0) of texture image memory 146. As an example using a 2MB texture memory 146 in which each u coordinate and each y coordinate includes 12 bits, consider a (u,v) coordinate pair with the value, in hex, of (3B4, 275). In binary, u=0011 1011 0100 and v=0010 0111 0101. In the presently preferred embodiment, the transformation function achieves the offset address by interleaving alternating bits of the coordinate pair such that the offset is as follows:

$$v_{11}u^{11}v_{10}u^{10} \ldots v_2u_2v_1u_1v_0u_0$$

Using the example values of v=275 and u=3B4, the interleaving of alternating bits in the manner described produces an offset of 0D6F32. This offset would be added to the address of memory location 0 of texture image memory 146 to produce the texture image memory address corresponding to coordinate pair (3B4, 275). Using this method of interleaving coordinate address pairs to form offset values, a correspondence is achieved between physical memory pages and 2D portions of the texture image coordinate space thereby improving the performance when the image is mapped to an object. In the preferred embodiment, the interleaving is accomplished with dedicated hardware circuitry in translator 144. In other embodiments, a similar result can be obtained through a software implementation such as a piece of code resident in translator 144.

Figure 5:
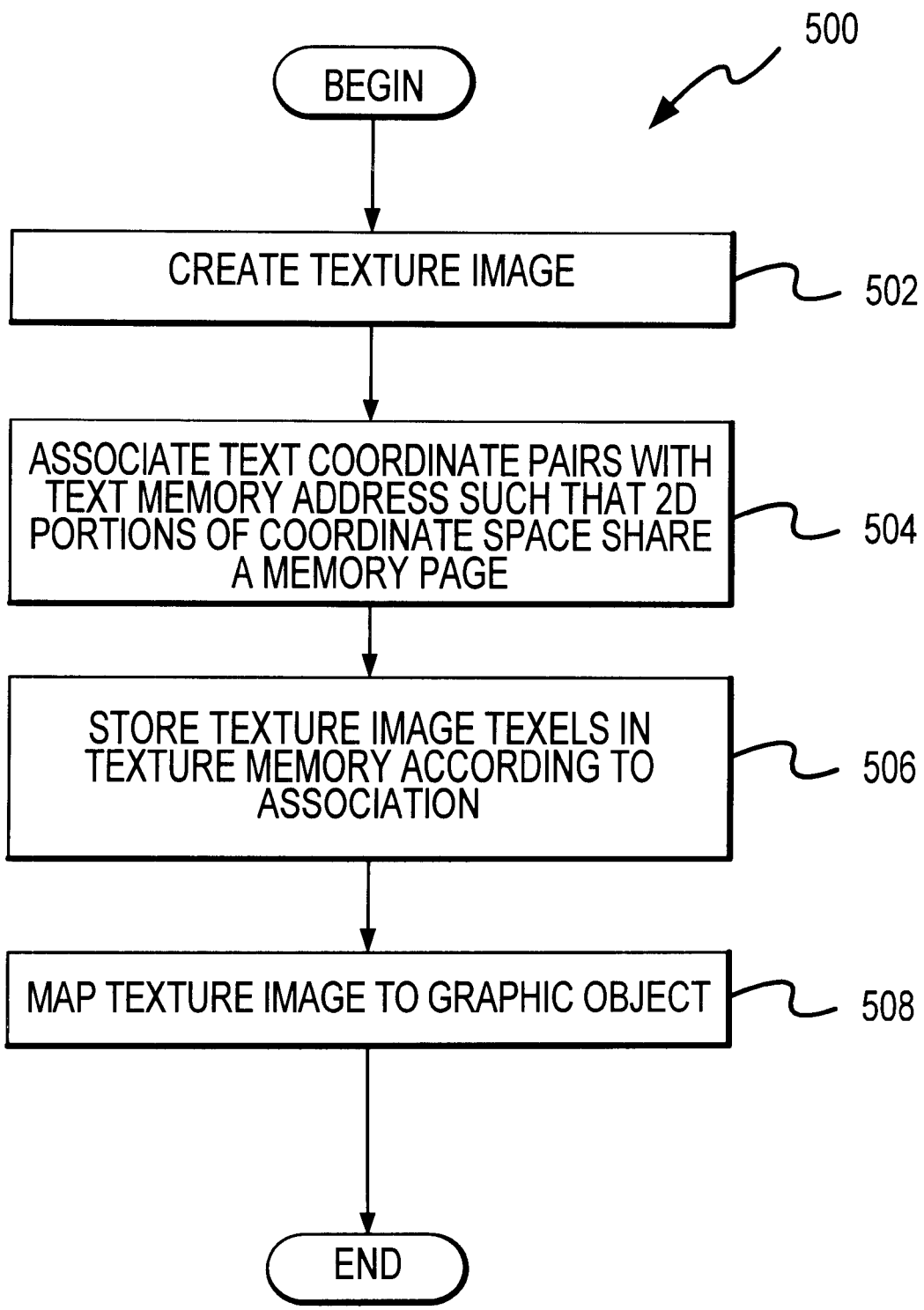
FIG. 5 is a flow diagram of a method of performing texture mapping according to one embodiment of the present invention.

Turning to FIG. 5 a flow diagram of a method 500 of improving the performance of texture memory mapped applications in accordance with the present invention is presented. Initially a texture image is created (step 502) with an application program and a suitable graphics API such as OpenGL. The texture coordinate pairs of the texture image are then associated (step 504) with 2D portions of the texture coordinate space preferably through the use of a translator 144 as described above. After the appropriate translation has been accomplished for each texel comprising the texture image, the texels are stored (step 506) in texture image memory 146. Thereafter, when the texture image stored in texture image memory 146 is mapped to a typical graphic object such as a triangle or polygon, the optimized page association achieved by translator 144 enable graphics adapter 112 to map (step 508) the texture image to the graphic object in an optimized fashion.

It will be apparent to those skilled in the art having the benefit of this disclosure that the present invention contemplates an efficient mechanism for improving the efficiency of texture mapping operations in a graphics display system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of storing a texture image in a memory of a graphics display system, the memory organized as a set of memory pages, each memory page representing a portion of memory that is retrieved and stored as a single entity, the texture image comprising a set of texels, wherein each texel is associated with a corresponding (u,v) coordinate pair in a texture coordinate space, the method comprising:

dividing the texture coordinate space into a set of two-dimensional coordinate space portions, wherein each coordinate space portion includes at least two coordinate space rows and at least two coordinate space columns and wherein the number of coordinate space rows and columns in each texture coordinate space portion differs by less than two;

mapping each two-dimensional texture coordinate space portion to a corresponding memory page such that values for texels from a selected coordinate space portion are stored within a single page of the memory whereby texel values corresponding to an object that spans two dimensions of the texture coordinate space may be located entirely within a single page of the memory.

2. The method of claim 1, further comprising mapping at least a portion of the texture image to an object while rendering the object.

3. The method of claim 1, wherein each of the memory pages comprises a contiguous portion of a dedicated texture memory.

4. The method of claim 1, wherein mapping each coordinate space portion to its corresponding memory page comprises interleaving all of the u bits and the v bits of each (u,v) coordinate pair in the coordinate space portion to generate an offset value.

5. The method of claim 4, further comprising adding the offset value to a base address of the memory to generate the memory address.

6. A graphics adapter, comprising.

a peripheral bus interface;

a controller coupled to the peripheral bus interface and suitable for mapping a texture image to an object; and a translator configured to receive (u,v) coordinate pairs associated with the texture image from the controller and, responsive thereto, to transform each of the (u,v) coordinate pairs to a corresponding memory address, wherein the translator maps at least one two dimensional portion of the (u,v) coordinate space to a single page of the memory wherein the number of coordinate space rows and columns in each texture coordinate space portion differs by less than two.

7. The graphics adapter of claim 6, wherein the controller is further adapted to map at least a portion of the texture image to an object while rendering the object.

8. The graphics adapter of claim 6, wherein each of the memory pages comprises a contiguous portion of a dedicated texture memory.

9. The graphics adapter of claim 6, wherein the translator is configured to interleave all of the u-bits and v-bits of the (u,v) coordinate pair to generate an offset value.

10. The graphics adapter of claim 9, wherein the translator is further adapted to add the offset value to a base address of the memory to generate the memory address.

11. The graphics adapter of claim 6, wherein the peripheral bus interface is suitable for coupling to bus compliant with an architecture selected from the group of bus architectures consisting of the PCI and AGP bus architectures.

12. A computer system comprising:

at least one processor;

a system memory accessible to each of the at least one processors via a system bus, the system memory comprising a plurality of individually retrievable memory pages wherein successive accesses to memory locations within a single memory page complete faster than successive access to memory locations from different pages;

a bus bridge coupled between the system bus and a peripheral bus; and graphics adapter coupled to the peripheral bus, wherein the graphics adapter includes:

a peripheral bus interface coupled to the peripheral bus interface;

a controller coupled to the peripheral bus interface and suitable for mapping a texture image to an object; and a translator configured to receive (u,v) coordinate pairs associated with the texture image from the controller and, responsive thereto, to transform each of the (u,v) coordinate pairs to a corresponding memory address, wherein the translator maps at least one two dimensional portion of the (u,v) coordinate space to a single page of memory wherein the number of coordinate space rows and columns in each texture coordinate space portion differs by less than two.

13. The system of claim 12, wherein the controller is further adapted to map at least a portion of the texture image to an object while rendering the object.

14. The system of claim 12, wherein each of the memory pages comprises a contiguous portion of a dedicated texture memory.

15. The system of claim 12, wherein the translator is configured to interleave all of the u-bits and v-bits of the (u,v) coordinate pair to generate an offset value.

16. The system of claim 15, wherein the translator is further adapted to add the offset value to a base address of the memory to generate the memory address.

17. The system of claim 12, wherein the peripheral bus interface is suitable for coupling to bus compliant with an architecture selected from the group of bus architectures consisting of the PCI and AGP bus architectures.

* * * * *